Patented Apr. 27, 1943

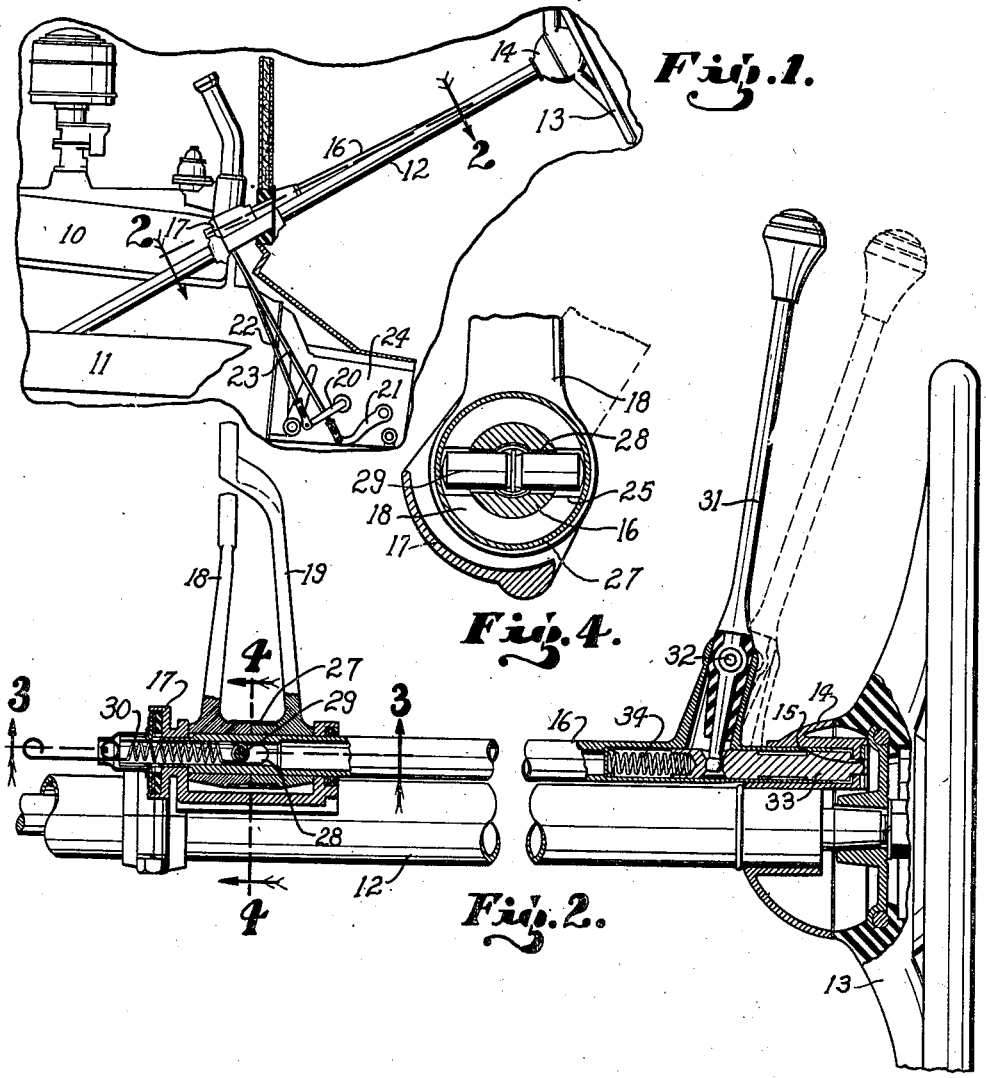

2,317,654

UNITED STATES PATENT OFFICE 2,317,654

GEARSHIFT MECHANISM

John J. Wharam, Dearborn, Mich., assignor to Ford Motor Company, Dearborn, Mich., a corporation of Delaware Application March 14, 1941, Serial No. 383,318

6 Claims. (Cl. 74—484)

The object of this invention is to provide a transmission-controlling device for use in connection with motor vehicles.

More particularly, this invention relates to a steering-column type of gearshift for controlling an automobile sliding gear transmission. In the usual form of this construction, a shift lever is mounted beneath the steering wheel of the vehicle; and said lever is connected through a suitable linkage to the transmission so that movement of this shift lever to various selective positions will shift the gears or clutches in the transmission to effect the various speed ratios desired. The improvements described herein provide a means by which the shifting routine may be simplified.

In the customary type of steering-column gearshifting devices, the manual operation of the shifting lever is as follows:

From the neutral position of said gearshifting lever, the lever is brought upwardly and is then drawn clockwise, engaging first or low gear. The change therefrom to intermediate or second gear is accomplished by moving the lever counterclockwise, lowering it, and then again moving it counterclockwise. When it is desired to change from second gear into high, the lever is merely moved clockwise. It will be noted that the motion required to complete the shift from low to intermediate is relatively complicated since the path followed by the end of the gearshift lever resembles somewhat a letter Z. The device of this invention is designed to obviate this difficulty.

A construction is provided in which the shift from neutral to first and from second to high is accomplished in the same manner as previously, but in which the shift from first to second is accomplished by merely moving the operating lever in a counterclockwise direction.

In other respects, the construction of the shifting lever and the sliding gear transmission, per se, is substantially that of prior construction, the device of this invention being employed in the linkage through which the connection between these two elements is made.

With these and other objects in view, my invention consists in the arrangement, construction and combination of the various parts of my improved device as described in this specification, claimed in my claims, and illustrated in the accompanying drawing, in which:

Figure 1 is a fragmentary view of a motor vehicle having this improvement installed therein.

Figure 2 is a view of the steering column, as indicated by the line 2—2 on Figure 1, portions thereof being sectioned to more fully disclose the mechanism.

Figure 3 is a sectional view taken on the line 3—3 of Figure 2.

Figure 4 is a sectional view taken on the line 4—4 of Figure 2.

Attention is now directed to Figure 1 of the drawing, in which reference character 10 indicates the motor assembly of a motor vehicle, 11 the frame of such a vehicle having a steering column 12 extending diagonally upwardly and rearwardly and having a steering wheel 13 rotatably mounted on the end of said steering column.

A housing 14 is secured to the upper end of the steering column 12 and includes the supporting means 15. A tubular shaft 16 has its upper end rotatably and reciprocally mounted in the support 15 and extends downwardly therefrom through an opening in the floor board of the car and has its lower end reciprocally and rotatably mounted in a bracket 17 which is clamped to the adjacent portion of the steering column 12. A pair of arms 18 and 19 respectively, is rotatably mounted upon the shaft 16 adjacent to the bracket 17, said arms being connected with the transmission levers 20 and 21 respectively, by means of the links 22 and 23. The levers 20 and 21 are rotatably mounted on the transmission 24 of the vehicle and their function is to slide the gears and clutches within the transmission to engage the several speed ratios obtainable therein. It will be apparent that the oscillation of the arm 18 in either direction from the neutral position will oscillate the lever 20 accordingly and thereby engage two different speeds in the transmission; and likewise, oscillation of the arm 19 will oscillate the lever 21 and thereby engage the other two speeds in the transmission.

Referring to Figure 2, it will be noted that the hub portions of the arms 18 and 19 are provided with diametrical slots or notches 25 and 26, respectively, and that a sleeve 27 is loosely assembled over these hub portions to form an enclosure for the two slots. When the arms 18 and 19 are in neutral position, the slots 25 and 26 are aligned with each other. Near the lower end of the tubular shaft 16 are the transverse, elongated slots 28 extending therethrough. Disposed within the slots 28 and engaging with the notches 25 or 26 is a pin 29. The diameter of the pin 29 is somewhat less than the transverse dimension of the slots 28 so that it may slide longitudinally of said slots. A spring 30 is provided between said pin and said bracket by means of which the pin is urged toward the lower position in the slots 28.

A shifting lever 31 is pivotally mounted on a fulcrum 32 which projects outwardly from one side of the upper end of the shaft 16 and the inner end of the lever 31 is anchored in a stationary holding means 33 which is secured in the support 15.

Thus, when the outer end of the lever 31 is moved upwardly, the shaft 16 will also be moved upwardly, the relative motion and velocity of said shifting lever and said shaft being dependent on the respective lengths of the shifting lever and the distance of the fulcrum 32 from the support 33. A spring 34 is arranged between the support and the shaft, normally urging the shaft downwardly.

In Figure 2, the gearshift is shown in a neutral position. In the ordinary operation of such a gearshift with conventional linkage, the operator would draw the outer ends of the lever 31 toward the wheel 13, as shown in dotted line, to raise the shaft 16 and then clockwise to engage the first speed of the transmission. To change from first to second speed, the lever would be returned to a neutral position by moving it counterclockwise and down, thence counterclockwise. Third speed would be engaged by simply moving the lever 31 clockwise. This sequence of operation is more or less conventional at the present time in the automotive industry.

With this device, the sequence of operation is changed in the interest of convenience. Starting from the neutral position shown, the lever 31 is moved upwardly to the position shown in dotted line, thereby raising the shaft 16 and the pin 29 into alignment with the slot 26. The lever is then rotated clockwise, causing the pin to engage the hub of lever 19 and turn it correspondingly, thereby engaging the first gear. When the operator releases the shift lever, instead of remaining in the dotted position as in the conventional shifting arrangement, the shaft 16 and the shift lever 31 will be forced downwardly into the neutral position by the spring 34. Such motion is permitted by reason of the fact that the pin 29 is mounted on the slots 28; and although the pin is engaged in the hub slot 26, the shaft 16 is still free to move downwardly.

Now, when it is desired to shift from first into second the shift lever need only be moved counterclockwise. This will cause rotation of the shaft 16 and correspondingly of the pin 29. The pin, consequently, will cause a rotation of the arm 19 until the slots 25 and 26 are aligned, at which point the spring 30 will automatically draw the pin downwardly into the slot 25. The continued counterclockwise rotation of the shaft and the pin will then engage the hub of arm 18 and will rotate it, changing the gear to engage second speed. In order to avoid a clicking noise which may be objectionable when the pin is drawn downwardly, recesses 35 are formed in the lower end of the notch 25 and suitable cushioning material 36 placed therein extending into the slots. A similar action results when the shift is made to reverse, i. e., the shifting lever automatically is drawn downwardly to the neutral position of reciprocation.

When it is desired to change from second to third speed, a mere rotation of the shift lever 31 clockwise will effect this. It is then apparent that by using the mechanism described the manual routine required in shifting from first to second speed is considerably simplified. Indeed, this shift is occasioned by merely moving the shifting lever counterclockwise through the neutral position without any change in the longitudinal position of the lever. This may be accomplished much more quickly, more effectively and with greater ease than is possible with the conventional device. The advantage of this device is that the gearshift lever automatically returns to neutral after engagement has been made with first speed and that the shift from first into second speed can be made with the same facility as the shift from second into third. The circuitous path required by the conventional shift is avoided, as is the tendency to shift from first speed into reverse unintentionally when it was desired to shift into second.

Some changes may be made in the arrangement, construction and combination of the various parts of my improved device without departing from the spirit of my invention, and it is my intention to cover by my claims such changes as may be reasonably included within the scope thereof.

I claim as my invention:

1. In a transmission having several selectively engageable speed ratios therein, a pair of axially aligned arms adapted to be selectively oscillated to cause selective engagement of said speed ratios, a shaft axially aligned with said arms, said shaft being reciprocally and rotatably mounted for movement relative thereto, means for rotating and reciprocating said shaft, a clutch associated with said shaft which in one position of reciprocation of said shaft clutches said shaft to one of said arms and in its other position of reciprocation clutches said shaft to the other of said arms, said clutch comprising a longitudinal slot in said shaft and a pin slidably mounted in said slot and adapted to engage selectively one or the other of said arms.

2. In a transmission having several selectively engageable speed ratios therein, a pair of axially aligned arms adapted to be selectively oscillated to cause selective engagement of said speed ratios, a shaft axially aligned with said arms, said shaft being reciprocally and rotatably mounted for movement relative thereto, means for rotating and reciprocating said shaft, a clutch associated with said shaft which in one position of reciprocation of said shaft selectively clutches said shaft to one or the other of said arms and in its other position of reciprocation clutches said shaft to one of said arms, said clutch comprising a longitudinal slot in said shaft and a pin slidably mounted in said slot and adapted for motion longitudinally of said shaft, and spring means urging said shaft means to one position of reciprocation.

3. In a motor vehicle, a transmission having several selectively engageable speed ratios therein, a steering column, a pair of axially aligned arms rotatably mounted upon the lower end of said steering column, link members connecting said arms to said transmission so that selective oscillation of said arms causes selective engagement of said speed ratios, a shaft reciprocally and rotatably mounted upon said steering column, a lever for rotating and reciprocating said shaft, a pin extending transversely through said shaft which in one position reciprocates with said shaft and coacts with a notch in one of said arms to rotatably clutch said arm to said shaft and in its other position of reciprocation coacts with a notch in the other of said arms to rotatably clutch said other arm in said shaft, a slot in said shaft, said pin being slidably mounted in said slot, a stationary bracket disposed adjacent to said arms, a stationary support disposed adjacent to said lever, spring means between said support and said lever, and a second spring means between said bracket and said pin.

4. In a vehicle transmission-shifting device, a steering column, a housing supported on the upper end of said column, a support in said housing, a bracket fixed upon the lower end of said column, a shaft rotatably and reciprocally mounted in said bracket and said support, a lever extending radially from the upper end of said shaft for oscillating and reciprocating same, a pair of arms rotatably mounted side by side in axial alignment with said shaft upon said bracket, a pair of link members connecting said arms respectively to said transmission so that oscillation of said arms causes selective engagement of the speed ratios of said transmission, the adjacent faces of said arms each having a diametrical notch therein, a pin member extending through said shaft which in one position of reciprocation of the shaft engages one of said notches to clutch said shaft to one of said arms and in its other position of reciprocation engages the other of said notches to clutch said shaft to the other said arms, a longitudinal slot in said shaft, said pin being mounted and being slidably disposed in said slot, and resilient means between said support and said lever and a second resilient means between said bracket and said pin.

5. In a vehicle transmission-shifting device, a steering column, a housing supported on the upper end of said column, an anchor in said housing, a bracket fixed upon the lower end of said column, a shaft rotatably and reciprocally mounted in said bracket and supported on said anchor, a lever extending radially from the upper end of said shaft for oscillating and reciprocating said shaft, a pair of arms rotatably mounted upon said bracket in axial alignment with said shaft, said shaft extending through the hub portions of said arms, link members connecting the outer ends of said arms to said transmission so that oscillation of said arms causes selective engagement of the speed ratios in said transmission, a pin member extending through said shaft in substantial alignment with said arms, the hub portions of said arms each having a diametrically extending notch therein, said notches being in line with each other when said arms are in their neutral positions, said pin member in one position of reciprocation of said shaft engaging one of said notches to rotatably clutch one of said arms and shaft and in its other position of reciprocation engaging the other of said notches to rotatably clutch the other of said arms to said shaft, a longitudinal slot in said shaft, said pin being slidably mounted in said slot, spring means between said anchor and said lever urging the outer end of said lever downwardly, and second spring means between said bracket and said pin urging said pin into position for engagement with the lower of said arms.

6. In a transmission having several selectively engageable speed ratios, a control shaft reciprocally and rotatably mounted, a pair of arms associated with said shaft adapted to be selectively oscillating to cause selective engagement of said speed ratios, means for rotating and reciprocating said shaft, a clutch member between said shaft and said arms selectively engaging one or the other of said arms, and means associated with said clutch whereby one or the other of said arms may be selectively engaged to said shaft in one position of reciprocation of said shaft.

JOHN J. WHARAM.